(12) United States Patent
Kantor et al.

(10) Patent No.: US 9,694,642 B2
(45) Date of Patent: Jul. 4, 2017

(54) SEAL ARRANGEMENT FOR AN AIR SPRING SYSTEM

(71) Applicant: KNORR-BREMSE Systeme fuer Nutzfahrzeuge GmbH, Munich (DE)

(72) Inventors: Kornel Kantor, Kecskemet (HU); Miklos Tanczos, Kecskemet (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 83 days.

(21) Appl. No.: 14/663,129

(22) Filed: Mar. 19, 2015

(65) Prior Publication Data

US 2015/0191066 A1 Jul. 9, 2015

Related U.S. Application Data

(63) Continuation of application No. PCT/EP2013/069619, filed on Sep. 20, 2013.

(30) Foreign Application Priority Data

Sep. 21, 2012 (DE) ........................ 10 2012 108 930

(51) Int. Cl.
*F16F 9/05* (2006.01)
*B60G 15/12* (2006.01)
(Continued)

(52) U.S. Cl.
CPC ........... *B60G 15/12* (2013.01); *B60G 15/062* (2013.01); *B60G 15/14* (2013.01);
(Continued)

(58) Field of Classification Search
CPC . F16F 9/05; F16F 9/084; F16F 9/3242; B60G 15/066; B60G 15/14;
(Continued)

(56) References Cited

U.S. PATENT DOCUMENTS 4,502,673 A * 3/1985 Clark .................. B62D 33/071
180/89.15
5,135,203 A * 8/1992 Wijnhoven ............. F16F 9/084
267/64.21
(Continued)

FOREIGN PATENT DOCUMENTS

AT 254726 B 6/1967
CN 1824967 A 8/2006
(Continued)

OTHER PUBLICATIONS

PCT/EP2013/069619, International Preliminary Report on Patentability (PCT/IB/373) dated Mar. 24, 2015, enclosing English Translation of Written Opinion of the International Searching Authority (PCT/ISA/237) (Seven (7) pages).
(Continued)

*Primary Examiner* — Thomas Irvin
(74) *Attorney, Agent, or Firm* — Crowell & Moring LLP

(57) ABSTRACT

A seal arrangement for an air spring system for sealing off a shock-absorbing damper is disclosed. The shock-absorbing damper is situated in a rolling tube and in another tube, where the air spring system has at least one integrated control valve for the admission of compressed air into a pressure chamber formed between the outer tube, the rolling tube, and an air spring bellows that connects the outer tube and rolling tube. The seal arrangement is arranged between an inner circumferential surface of the rolling tube and an outer circumferential surface of the shock-absorbing damper and/or between an inner circumferential surface of the outer tube and the outer circumferential surface of the shock-absorbing damper. A support ring which is of step-shaped form on an outer circumferential surface is arranged on a distal end of the rolling tube and/or on a distal end of the outer tube.

14 Claims, 2 Drawing Sheets

(51) Int. Cl.
  B60G 15/14   (2006.01)
  B60G 17/048  (2006.01)
  F16F 9/32    (2006.01)
  B60G 17/052  (2006.01)
  F16F 9/084   (2006.01)
  F16F 9/36    (2006.01)
  F16J 15/02   (2006.01)
  B60G 15/06   (2006.01)

(52) U.S. Cl.
  CPC ..... *B60G 17/0485* (2013.01); *B60G 17/0521* (2013.01); *B60G 17/0528* (2013.01); *F16F 9/05* (2013.01); *F16F 9/084* (2013.01); *F16F 9/3242* (2013.01); *F16F 9/369* (2013.01); *F16J 15/021* (2013.01); *B60G 15/066* (2013.01); *B60G 2202/314* (2013.01); *B60G 2204/1262* (2013.01); *B60G 2204/40* (2013.01)

(58) Field of Classification Search
  CPC ............ B60G 17/0485; B60G 17/0521; B60G 2202/314; B60G 2204/1262
  USPC ................. 267/64.24, 64.23; 188/322.16
  See application file for complete search history.

(56) References Cited

U.S. PATENT DOCUMENTS

| | | | | |
|---|---|---|---|---|
| 5,518,225 | A * | 5/1996 | Gubitz | B60G 15/12 267/64.24 |
| 5,669,597 | A * | 9/1997 | Rittstieg | B60G 17/044 267/64.17 |
| 6,227,527 | B1 | 5/2001 | Berg | |
| 6,286,820 | B1 * | 9/2001 | Raulf | B60G 15/14 267/64.21 |
| 6,332,624 | B1 * | 12/2001 | Gilsdorf | B60G 17/0485 267/64.21 |
| 6,454,248 | B2 * | 9/2002 | Pradel | B60G 17/044 267/64.11 |
| 6,962,330 | B2 | 11/2005 | Klitsch et al. | |
| 7,175,165 | B1 * | 2/2007 | Vande Brake | F16F 9/057 267/64.21 |
| 2002/0011697 | A1 | 1/2002 | Pesch et al. | |
| 2002/0171185 | A1 * | 11/2002 | Morrow | B60G 11/26 267/64.12 |
| 2006/0191757 | A1 | 8/2006 | Kojima | |
| 2010/0320657 | A1 * | 12/2010 | Chapman | F16F 9/0454 267/140.13 |
| 2011/0101578 | A1 * | 5/2011 | Ji | B60G 15/12 267/64.15 |
| 2011/0140323 | A1 * | 6/2011 | Kwon | B60G 15/12 267/64.24 |
| 2015/0191068 | A1 * | 7/2015 | Kantor | B60G 11/27 280/6.157 |

FOREIGN PATENT DOCUMENTS

| | | |
|---|---|---|
| DE | 84 13 300 U1 | 9/1984 |
| DE | 195 05 026 A1 | 8/1996 |
| DE | 197 53 637 A1 | 6/1998 |
| DE | 199 59 839 A1 | 7/2000 |
| DE | 100 37 026 C1 | 11/2001 |
| DE | 102 15 492 B3 | 2/2004 |
| DE | 103 36 147 A1 | 4/2004 |
| DE | 10 2006 008 704 A1 | 8/2006 |
| DE | 10 2010 026 236 A1 | 2/2011 |
| DE | 10 2010 012 346 A1 | 9/2011 |
| DE | 10 2010 017 336 A1 | 12/2011 |
| EP | 1 262 341 B1 | 12/2002 |
| EP | 1 353 085 B1 | 10/2003 |
| EP | 2 550 168 B1 | 1/2013 |
| GB | 1 012 982 A | 12/1965 |

OTHER PUBLICATIONS

PCT/EP2013/069619, International Search Report dated Dec. 18, 2013 (Three (3) pages).
German Examination Report dated May 10, 2013 (Nine (9) pages).
Chinese Office Action issued in Chinese counterpart application No. 201380054816.6 dated Apr. 1, 2016, with partial English translation (Eight (8) pages).

* cited by examiner

SEAL ARRANGEMENT FOR AN AIR SPRING SYSTEM

CROSS REFERENCE TO RELATED APPLICATIONS

This application is a continuation of PCT International Application No. PCT/EP2013/069619, filed Sep. 20, 2013, which claims priority under 35 U.S.C. §119 from German Patent Application No. 10 2012 108 930.2, filed Sep. 21, 2012, the entire disclosures of which are herein expressly incorporated by reference.

BACKGROUND AND SUMMARY OF THE INVENTION

The present invention relates to a seal arrangement for an air spring system for sealing a shock absorber which is situated in a rolling tube and an outer tube, the air spring system having at least one integrated control valve for loading a pressure chamber with compressed air, which pressure chamber is formed between the outer tube, the rolling tube and by an air spring bellows which connects them, the seal arrangement being arranged, furthermore, between an inner circumferential face of the rolling tube and an outer circumferential face of the shock absorber and/or between an inner circumferential face of the outer tube and the outer circumferential face of the shock absorber.

The field of use of the invention extends principally to vehicle technology. Vibration dampers which comprise a usually hydraulic damping element and an air spring system which interacts with it are used, for example, in the area of the chassis of commercial vehicles. In the context of an integrated design, the damping element usually has a container tube which is connected to a rolling tube of the air spring, the rolling tube being connected via an air spring bellows which acts as rolling bellows to an outer tube which is arranged concentrically and such that it can be moved axially relative to the rolling tube. The air spring bellows, the rolling tube and the outer tube delimit a pressure chamber which is under air pressure for suspension purposes.

In the case of air spring systems with an air spring which encloses a shock absorber, it is always critical to ensure a sealed state between the shock absorber and an outer tube or a rolling tube.

A generally known solution for sealing a shock absorber which is situated in a rolling tube and an outer tube is an annular groove which is configured in the bore of the rolling tube and receives at least one seal element. A disadvantage of the solution is that the annular groove can be configured only by way of subsequent turning of the rolling tube which is usually produced as a plastic injection molded part, as a result of which the machining time per component is increased. A solution of this type is shown, inter alia, in FIG. 1 in the document DE 10 2010 012 346 A1.

A suspension strut, comprising a shock absorber which contains an outer tube and a piston rod and a rod guide arrangement, is apparent from the document EP 1 262 341 B1. The rod guide arrangement comprises a rod sealing arrangement which has an annular disk with a plurality of seals which are connected to it. The annular disk is received in an upper section of the rod guide. Furthermore, the suspension strut comprises an elastomer seal which is arranged between the shock absorber and the air spring piston in order to seal the sealed chamber. The elastomer seal is arranged between an annular disk of the shock absorber rod sealing arrangement and the radially inwardly extending flange of the air spring piston. According to one preferred embodiment, the suspension strut comprises an annular metal plate which is connected to the elastomer seal. The annular metal plate is configured in such a way that it fits together with the air spring piston, in order to position the elastomer seal between the radially inwardly extending flange of the air spring piston and the flange section of the outer tube of the shock absorber.

Furthermore, a seal arrangement for an air spring system is apparent from DE 102 15 492 B3, for sealing a first closed pressure space of a damper, which pressure space contains a first hydraulic medium and a piston rod which is guided displaceably in the pressure space, with respect to a second closed pressure space of a spring bellows with a second gaseous pressure medium. The first and the second pressure medium load a seal ring which is prestressed by way of at least one prestressing element with pressure via a gap to be sealed between the damper and its piston rod which can be moved concentrically with respect to one another. Between the second pressure space and a groove space which is arranged in the damper and in which the seal arrangement with the seal ring and the at least one prestressing element is arranged, a pressure connection is provided in the region of the prestressing elements in a groove bottom and/or at least one groove flank. Furthermore, the sealing ring and the at least one prestressing element are adapted to one another in such a way that, independently of the pressure level of the first and second pressure medium, the contact pressure distribution of the seal ring on the machine component which bears directly via one or more seal edges remains constant. The at least one prestressing element preferably consists of two elastic clamping rings.

Moreover, a pneumatic suspension system with a cylinder body and a piston which is provided with a piston rod is apparent from the document DE 10 2010 026 236 A1. Here, the piston and the cylinder body form a cylinder. The cylinder body passes through a suspension body, a seal being arranged between the suspension body and the cylinder body. The cylinder body and the seal ensure shutting and sealing of an opening of the suspension body. The seal in the opening of the suspension body is accommodated between a shoulder of the suspension body and an elastic ring which is arranged against a radial edge of the suspension body. The shoulder of the suspension body and the elastic ring which is arranged against the radial edge form a seal seat. The seal seat is obtained without machining of the suspension body. Although machining steps are dispensed with in this way, special tools are required. Furthermore, the pneumatic suspension system contains a spring which presses on the elastic ring and is connected to the piston rod, in order that the entry of the piston rod into the cylinder body compresses the spring.

DE 100 37 026 C1 discloses an air spring strut, consisting of a rolling bellows which can roll on a rolling shell, a hydraulic vibration damper which is arranged within the rolling bellows and/or the rolling shell with a piston rod which dips into it in an oscillating manner, and an upper and a lower termination and fastening part provided with seals. O-rings are used as seals, which O-rings lie in a recess of a first component, which recess is in each case open radially and axially on one side, are supported radially on the second component and are held and/or braced axially via a ring which is connected to the first component. The ring which holds the O-ring seal is configured such that it is split radially once or multiple times and engages as a snap-action/latching connection into a circumferential groove of the first component.

It is therefore the object of the present invention to provide a seal arrangement for an air spring system, which seal arrangement ensures the sealed state between a shock absorber and a rolling tube, but also the sealed state between the shock absorber and an outer tube; the production and the mounting of the seal arrangement on the air spring system are to be improved.

According to the invention, a supporting ring which is of step-shaped configuration on an outer circumferential face is arranged at a distal end of the rolling tube and/or at a distal end of the outer tube. Here, the stepped ring penetrates partially into the rolling tube and/or into the outer tube. A proportion of the stepped ring which is smaller in contrast is arranged outside the rolling tube and/or outside the outer tube. It is conceivable to arrange the supporting ring only on the outer tube or only on the rolling tube, but it is particularly advantageous to arrange the supporting ring both on the outer tube and on the rolling tube.

It is particularly preferred that the supporting ring is configured from a metallic material. A metallic supporting ring has the advantage of greater strength and wear resistance in comparison with a supporting ring which is composed of a polymer. The selection of a lightweight metal, such as aluminum, in particular, is particularly advantageous, as a result of which weight saving can be realized.

The invention includes the technical teaching that the supporting ring is connected to the rolling tube and/or the outer tube in an integrally joined manner. In particular, a welded or adhesively bonded connection may be suitable here.

The distal end of the rolling tube and/or the distal end of the outer tube preferably includes, on the inner circumferential face, a receiving region which is configured for receiving the supporting ring and has a greater internal diameter than a surrounding region, an increase in the internal diameter being sudden, as a result of which the formation of a shoulder arises. In terms of manufacturing technology, the receiving region is produced via reaming of the distal end of the rolling tube and/or the distal end of the outer tube. However, it is also provided to produce the rolling tube and/or the outer tube directly with the receiving region using primary forming technology. The sudden increase in the internal diameter of the rolling tube and/or the outer tube takes place on account of a sharp edge which preferably runs perpendicularly with respect to the inner circumferential face. As a result, the shoulder is formed between the receiving region which has a greater internal diameter and the surrounding region which has a smaller internal diameter in comparison.

According to one preferred exemplary embodiment, a seal element is arranged axially between an end face of the supporting ring and the shoulder. The seal element is arranged on an outer circumferential face of the shock absorber and is situated in the receiving region. The seal element is advantageously an O-ring.

According to a further preferred exemplary embodiment, an annular disk is arranged between the seal element and the end face of the supporting ring. The annular disk comes into contact both with the supporting ring and with the seal element and secures the position of the seal element as a result.

The supporting ring preferably has at least two step faces, one step face serving as a supporting face for the rolling tube or the outer tube and the other step face serving as a supporting face for the seal element or the annular disk. The step face which serves as a supporting face for the rolling tube or the outer tube fixes the supporting ring on the rolling tube or on the outer tube. The integrally joined connection advantageously takes place on this supporting face. The step face which serves as a supporting face for the seal element or the annular disk realizes axial positioning of the seal element or the annular disk.

Furthermore, it is preferred that the annular disk is mounted in a floating manner between the outer circumferential face of the shock absorber and the inner circumferential face of the rolling tube or in a floating manner between the outer circumferential face of the shock absorber and the inner circumferential face of the outer tube. The annular disk is therefore configured in such a way that it is arranged with a loose tolerance with respect to the outer circumferential face of the shock absorber, but also with a loose tolerance with respect to the inner circumferential face of the rolling tube or with respect to the inner circumferential face of the outer tube. As a result of the tolerances, stresses in the annular disk are prevented and an axial movement of the annular disk along the outer circumferential face of the shock absorber is promoted. It is provided, furthermore, that the annular disk is composed of a metallic material and an end face of the annular disk which is assigned to the seal element is surface-ground. A metallic annular disk has greater wear resistance and greater strength than an annular disk which is manufactured from a polymer. Furthermore, the surface-ground end face makes optimum contact possible and, as a result, optimum sealing between the annular disk and the seal element.

The invention includes the technical teaching that the end face of the supporting ring which serves as a supporting face for the seal element is surface-ground. In this case, the surface-ground end face likewise makes optimum contact and optimum sealing between the supporting ring and the seal element possible.

Other objects, advantages and novel features of the present invention will become apparent from the following detailed description of one or more preferred embodiments when considered in conjunction with the accompanying drawings.

Further measures which improve the invention will be shown in greater detail in the following text together with the description of one preferred exemplary embodiment of the invention using the figures.

DETAILED DESCRIPTION OF THE DRAWINGS

Figure 1:
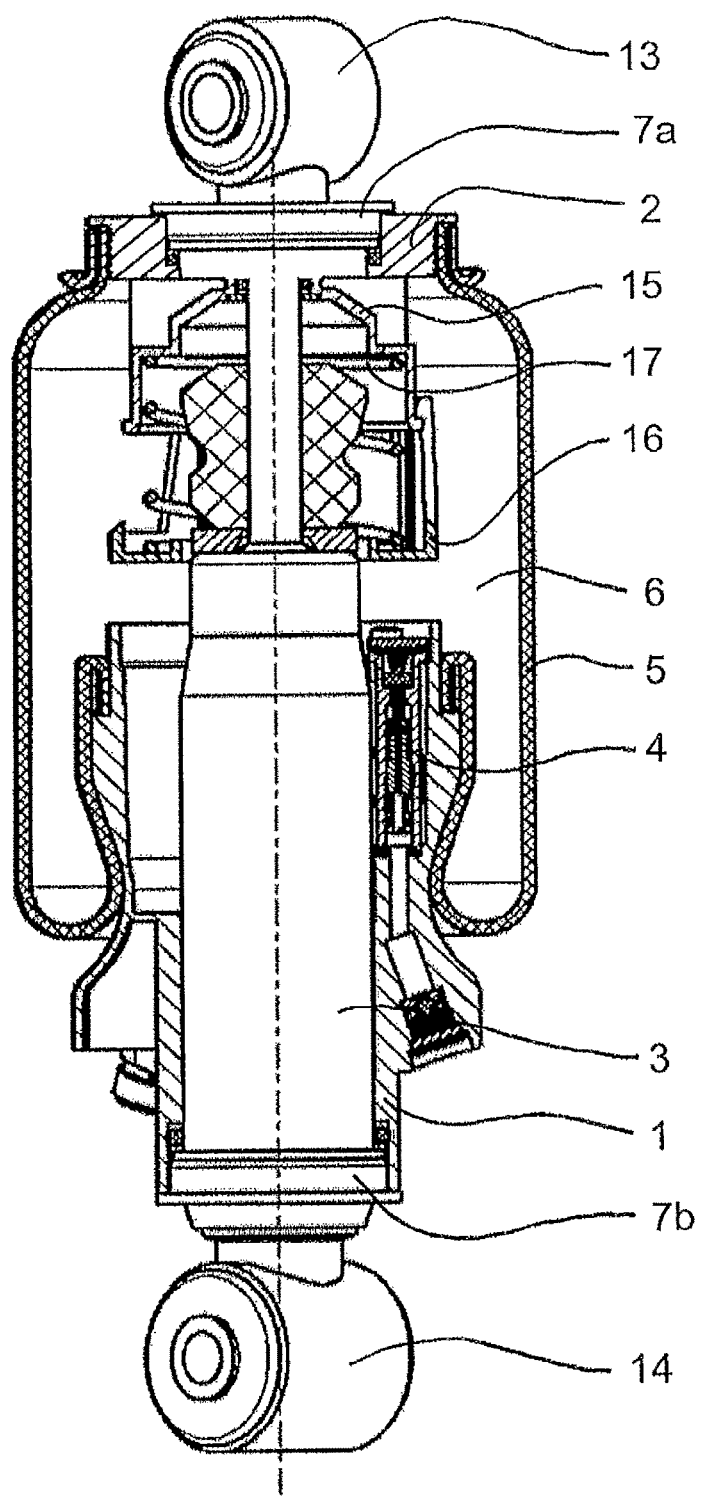
FIG. 1 is a partial longitudinal section through an air spring system having a seal arrangement according to the invention.

The air spring system according to FIG. 1 consists substantially of an outer tube 2 with an upper fastening eye 13, opposite which outer tube 2 a rolling tube 1 with an associated lower fastening eye 14 lies. The lower fastening eye 14 is a constituent part of a hydraulic shock absorber 3 which is surrounded coaxially by the outer tube 2 and the rolling tube 1. The upper fastening eye 13 is connected to a piston rod of the shock absorber 3. An air spring bellows 5 which is made from an elastomer material and rolls on the outer surface of the rolling tube 1 depending on the air spring stroke runs between the outer tube 2 and the rolling tube 1. A pressure chamber 6 which, loaded with compressed air, fulfills the air spring function of the air spring system is formed by the outer tube 2, the rolling tube 1 and the air spring bellows 5. A control valve 4 which is arranged on an inner circumferential face of the rolling tube 1 is provided for loading the pressure chamber 6 with pressure. Furthermore, together with a tube lower part 16 and a compression spring 17 which is prestressed and is arranged in between, a tube upper part 15 which is integrally formed coaxially on the outer tube 2 forms a telescopic arrangement.

In each case one metallic supporting ring 7a and 7b which is configured in a step-shaped manner on an outer circumferential face is connected in an integrally joined manner to a distal end of the rolling tube 1 and to a distal end of the outer tube 2. The distal end of the rolling tube 1 and the distal end of the outer tube 2 have a receiving region 8 which is configured for receiving the supporting rings 7a and 7b on the inner circumferential face. The receiving region 8 has a greater internal diameter than a surrounding region, the result of which is the formation of a shoulder 9.

Figure 2:
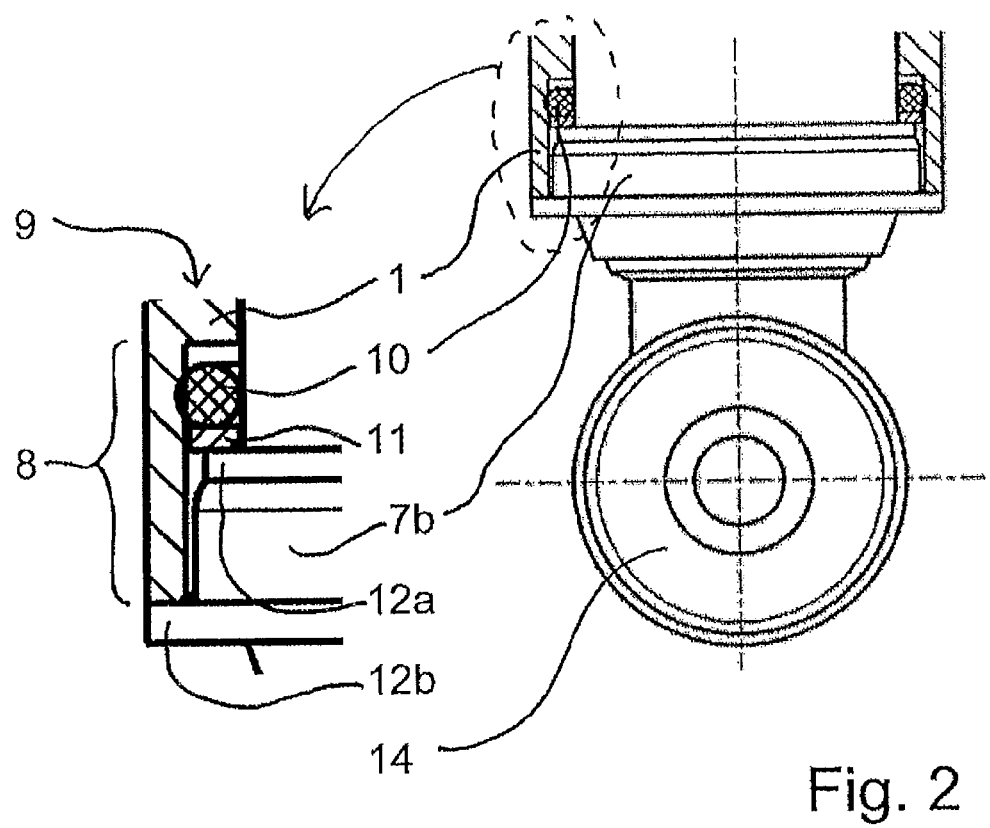
FIG. 2 is an enlarged longitudinal section through an air spring system having a seal arrangement according to the invention in accordance with a first preferred exemplary embodiment.

According to FIG. 2 which shows an enlarged illustration of the lower region of FIG. 1, a seal element 10 in the form of an O-ring is arranged on an outer circumferential face of the shock absorber 3. The seal element 10 is fixed by way of an annular disk 11 which is arranged axially on an end face of the supporting ring 7b. The supporting ring 7b has two step faces 12a and 12b, one step face 12b serving as a supporting face of the rolling tube 1 and the other step face 12a serving as a supporting face of the annular disk 11. The figure next to it represents an enlarged illustration of the seal arrangement which is shown only partially.

The arrangement is not restricted to the preferred exemplary embodiments which are described in the above text. Rather, modifications herefrom are also conceivable which are also included in the scope of protection of the following claims. It is thus also possible, for example, to arrange a different seal element 10 instead of an O-ring on the outer circumferential face of the shock absorber 3, which seal element 10 ensures the function of reliable sealing.

In addition, it is to be noted that "comprising" does not rule out any other elements or steps and "one" or "a" does not rule out a plurality. Furthermore, it is to be noted that features or steps which have been described with reference to one of the above exemplary embodiments can also be used in combination with other features or steps of other above-described exemplary embodiments. Designations in the claims are not to be considered to be restrictive.

LIST OF REFERENCE SIGNS

1 Rolling tube
2 Outer tube
3 Shock absorber
4 Control valve
5 Air spring bellows
6 Pressure chamber
7a, 7b Supporting ring
8 Receiving region
9 Shoulder
10 Seal element
11 Annular disk
12a, 12b Step face
13 Upper fastening eye
14 Lower fastening eye
15 Tube upper part
16 Tube lower part
17 Compression spring The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An air spring system with a seal arrangement, comprising:
    a shock absorber which is disposed in a rolling tube and an outer tube;
    a control valve for loading a pressure chamber with compressed air, wherein the pressure chamber is formed between the rolling tube, the outer tube, and an air spring bellows which connects the rolling tube and the outer tube; and
    a seal arrangement, wherein the seal arrangement is disposed between an inner circumferential face of the rolling tube and an outer circumferential face of the shock absorber, the seal arrangement comprising:
        a supporting ring which has a step-shaped configuration on an outer circumferential face of the supporting ring, wherein the supporting ring is disposed at a distal end of the rolling tube;
        wherein the distal end of the rolling tube includes, on the inner circumferential face, a receiving region in which the supporting ring is received, wherein the receiving region has a greater internal diameter than a surrounding region of the rolling tube and wherein an increase in the internal diameter forms a shoulder;
        a seal element, wherein the seal element is arranged axially between an end face of the supporting ring and the shoulder; and
        an annular disk, wherein the annular disk is arranged between the seal element and the end face of the supporting ring.

2. The air spring system with the seal arrangement as claimed in claim 1, wherein the supporting ring is a metallic or a polymeric material.

3. The air spring system with the seal arrangement as claimed in claim 1, wherein the supporting ring is connected to the shock absorber in an integrally joined manner.

4. The air spring system with the seal arrangement as claimed in claim 1, wherein the supporting ring has at least two step faces, wherein one of the at least two step faces is a supporting face for the rolling tube and wherein another of the at least two step faces is a supporting face for the seal element or the annular disk.

5. The air spring system with the seal arrangement as claimed in claim 1, wherein the annular disk is mounted in a floating manner between the outer circumferential face of the shock absorber and the inner circumferential face of the rolling tube.

6. The air spring system with the seal arrangement as claimed in claim 1, wherein the annular disk is a metallic or a polymeric material and wherein an end side of the annular disk arranged next to the seal element is surface-ground.

7. The air spring system with the seal arrangement as claimed in claim 1, wherein the end face of the supporting ring is surface-ground.

8. An air spring system with a seal arrangement, comprising:
- a shock absorber which is disposed in a rolling tube and an outer tube;
- a control valve for loading a pressure chamber with compressed air, wherein the pressure chamber is formed between the rolling tube, the outer tube, and an air spring bellows which connects the rolling tube and the outer tube; and
- a seal arrangement, wherein the seal arrangement is disposed between an inner circumferential face of the outer tube and an outer circumferential face of the shock absorber, the seal arrangement comprising:
  - a supporting ring which has a step-shaped configuration on an outer circumferential face of the supporting ring, wherein the supporting ring is disposed at a distal end of the outer tube;
  - wherein the distal end of the outer tube includes, on the inner circumferential face, a receiving region in which the supporting ring is received, wherein the receiving region has a greater internal diameter than a surrounding region of the outer tube and wherein an increase in the internal diameter forms a shoulder;
  - a seal element, wherein the seal element is arranged axially between an end face of the supporting ring and the shoulder; and
  - an annular disk, wherein the annular disk is arranged between the seal element and the end face of the supporting ring.

9. The air spring system with the seal arrangement as claimed in claim 8, wherein the supporting ring is a metallic or a polymeric material.

10. The air spring system with the seal arrangement as claimed in claim 8, wherein the supporting ring is connected to the shock absorber in an integrally joined manner.

11. The air spring system with the seal arrangement as claimed in claim 8, wherein the supporting ring has at least two step faces, wherein one of the at least two step faces is a supporting face for the outer tube and wherein another of the at least two step faces is a supporting face for the seal element or the annular disk.

12. The air spring system with the seal arrangement as claimed in claim 8, wherein the annular disk is mounted in a floating manner between the outer circumferential face of the shock absorber and the inner circumferential face of the outer tube.

13. The air spring system with the seal arrangement as claimed in claim 8, wherein the annular disk is a metallic or a polymeric material and wherein an end side of the annular disk arranged next to the seal element is surface-ground.

14. The air spring system with the seal arrangement as claimed in claim 8, wherein the end face of the supporting ring is surface-ground.

* * * * *